United States Patent Office 3,067,178
Patented Dec. 4, 1962

3,067,178
POLYESTERIFICATION PROCESS
Harry Greenberg and Stanley P. Rowland, Cincinnati, Ohio, assignors to National Distillers and Chemical Corporation, New York, N.Y., a corporation of Virginia
No Drawing. Filed Apr. 17, 1957, Ser. No. 653,269
8 Claims. (Cl. 260—75)

The present invention relates to a novel polyesterification process and catalyst compositions useful therefor and, more particularly, to such a process for preparation of polyesters by reaction of a dibasic acid with a glycol in the presence of certain catalysts that reduce the reaction time required for polyesterification to a defined degree of polymerization.

The invention embodied herein comprises reacting a dibasic acid with a glycol under esterification conditions in the presence of a catalyst consisting essentially of a titanium tetrahalide or a mixture thereof with a member from the group consisting of a zinc halide and zinc and in which mixture the titanium tetrahalide and the zinc-containing component are in relative amounts to provide a synergistic effect with respect to reducing the reaction time for esterification to a defined degree of polymerization. Catalyst components that may be used include titanium tetrachloride, titanium tetrabromide, titanium iodide, zinc bromide and zinc chloride.

In general, the process embodied herein comprises reacting a dibasic acid with a glycol under conditions conventional in the art for effecting esterification but in which process titanium tetrahalide or an aforesaid mixture therewith is utilized as the catalyst. Thus, and for effecting polyesterification, the reactants can be heated at a temperature of from about 100° to about 250° C., or higher, with or without a reaction diluent and, preferably, with use of a slight excess of the glycol so as to insure that little or no acidic component remains in the final ester product. During the reaction, the water by-product that is formed should be removed from the reacting mixture by distillation in order to facilitate completion of the esterification reaction.

With reference to the dibasic acid utilized for preparation of esters by the process embodied herein, there may be used a variety of such acids or their anhydrides including aliphatic diacids, aromatic diacids, cycloaliphatic diacids, and others. Thus, there may be used saturated or unsaturated aliphatic diacids such as succinic acid, adipic acid, methyladipic acid, fumaric acid, maleic acid, maleic anhydride, azelaic acid, sebacic acid and suberic acid; aromatic diacids such as phthalic acid, terephthalic acid, diphenyladipic acid and cycloaliphatic diacids such as dicyclohexyladipic acid, and others, as well as mixtures of diacids including a mixture consisting essentially of 2-ethylsuberic acid, 2,5-diethyladipic acid and sebacic acid. A specific example of such a mixture comprises about 5 to 10% sebacic acid and 70 to 80% of 2-ethylsuberic acid and 12 to 18% of 2,5-diethyladipic acid. Similarly, and with respect to the glycol reactant, saturated and unsaturated glycols may be used that vary over a rather wide range of carbon atom content. Thus, glycols for such usage include ethylene glycol, diethylene glycol, 1,2-propylene glycol, 1,3-butylene glycol, 1,6-hexanediol, octamethylene glycol, dodecamethylene glycol, 2-ethyl-1,8-octanediol, 3-ethyl-1,10-decanediol, 3,6-diethyl 1,8-octanediol, 4,7-diethyl-2,9-decanediol, 3,13-tetradecanediol, p-xylene glycol, and others.

As aforesaid, the catalyst employed in the process of the present invention is a titanium tetrahalide or mixtures thereof with either zinc metal, preferably in finely divided form, or a zinc halide. Generally speaking, the amount of catalyst employed is within the range of from about 0.01 to about one percent, or more, based on the weight of the dibasic acid reactant employed. With respect to the use of a catalyst comprising titanium tetrahalide in mixture with the zinc-containing component, such components are used in relative proportions which provide a synergistic effect, i.e., in such relative proportions that the esterification reaction time is reduced as compared to individual use of the titanium tetrahalide or the zinc-containing component in substantially similar or identical amounts based on the weight of the dibasic acid reactant.

Although the relative proportion of the components may be varied in the multiple component catalyst and yet obtain a synergist effect, such for example, in a mole ratio of one part of titanium tetrahalide to from about 0.1 to 10, and more specifically, about 0.5 to about 5.0 mols of the zinc-containing component, with a particularly suitable catalyst combination containing the titanium tetrachloride and zinc-containing component in substantially mol to mol ratio.

In order to further describe the invention, the following examples are set forth which illustrate the results obtained for polyesterification reaction between 1,2-propylene glycol and sebacic acid or a mixture of $C_{10}$ diacids consisting essentially of 2-ethylsuberic acid, sebacic acid and 2,5-diethyladipic acid in a ratio of 16:1:3. In the examples, runs are included illustrating the results obtained by sole use of titanium tetrachloride and zinc chloride as the catalyst as well as the synergistic results obtained by use of titanium tetrachloride in mixture with said zinc or zinc chloride. Also included are runs in which a conventional titanium-containing catalyst (titanium tetraisopropylate) was employed and over which the use of titanium tetrachloride or a mixture thereof with a zinc-containing compound, as embodied for use herein, provided a markedly reduced time requirement for polyesterification to a defined degree of polymerization. With respect to the examples set forth hereinafter, it should be understood that the particular reactants, catalysts and reaction conditions employed are for illustrative and not limitative purposes.

For each of the examples, the apparatus employed comprised a four-necked flask fitted with a suitable stirrer, thermometer, nitrogen gas inlet and steam condenser. The diacid reactant, the glycol reactant and catalyst were charged into the reactor flask while maintaining a flow of nitrogen gas and heat was applied until the mixture became homogenous. By use of a steam-heated, six bulb condenser as a dephlegmator, the glycol that was swept out by the steam and nitrogen was condensed while water passed out of the system, such water being finally condensed in a downward condenser and measured. When reaction started, i.e., upon first appearance of distillate, the temperature was raised at about 10° C. per hour until 200° C. was reached at which point the pressure was reduced slowly (in 4–5 hours) to about 5 mm. (Hg) whereupon the reaction was continued until the acid number was less than 5. The steam-heated condenser was then removed, the pressure lowered to 1–2 mm. (Hg) and the glycol distilled from the system as the viscosity rose to a desired level. The reactions were continued until Z–5 viscosity was obtained on the Gardner-Holdt Scale at 25° C., the viscosity being taken on samples diluted with an equal weight of perchlorethylene.

| Run No. | Diacid Reactant (grams) | Glycol Reactant (grams) | Catalyst (percent based on weight of diacid) | Reaction Time to develop viscosity of 100 poises (about Z–5 on Gardner Holt Scale at 25° C. in equal weight of perchlorethylene (hours) |
|---|---|---|---|---|
| 1 | Mixt. of 2-ethylsuberic, sebacic and 2,5-diethyladipic. 505 (2.5 mols) | 237.5 (2.5 mols+25% excess) | 0.1 zinc chloride | 26½ |
| 2 | ----do---- | ----do---- | 0.1 titanium tetraisopropylate | 26 |
| 3 | ----do---- | ----do---- | 0.1 titanium tetrachloride | 19½ |
| 4 | ----do---- | ----do---- | 0.26 (mol to mol ratio of zinc chloride and titanium tetrachloride) | 14½ |
| 5 | ----do---- | ----do---- | 0.1 zinc chloride and titanium tetrachloride in mol to mol ratio | 17½ |
| 6 | ----do---- | ----do---- | 0.1 (zinc dust and TiCl₄ in mol ratio of 3:1) | 17 |
| 7 | Sebacic Acid 505 | ----do---- | 0.17 TiCl₄ | 13½ |
| 8 | ----do---- | ----do---- | 0.17 titanium tetraisopropylate | 19 |

As is apparent from the foregoing tabulation, the data therein show that a reduced reaction time was required to reach the defined degree of polyesterification when titanium tetrachloride was used as compared to that required for zinc chloride and titanium tetraisopropylate and, moreover, that use of a combination of zinc or zinc chloride with titanium tetrachloride, markedly reduced the esterification time requirement due to a synergistic effect.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparing a polymeric polyester which comprises subjecting a dicarboxylic acid to reaction with a saturated glycol at a temperature of about 100° to about 250° C. in the presence of about 0.01 to about 1 percent, based on the weight of the dicarboxylic acid, of a combination catalyst consisting essentially of about one mol of a titanium tetrahalide in mixture with from about 0.1 to about ten mols of a zinc-containing component from the group consisting of zinc and a zinc halide.

2. A process, as defined in claim 1, wherein the titanium tetrahalide is titanium tetrachloride and the zinc-containing component is zinc chloride.

3. A process, as defined in claim 2, wherein the catalyst consists essentially of titanium tetrachloride and zinc chloride in a mol ratio of one mol of titanium tetrachloride to from about 0.5 to about 5.0 mols of zinc chloride.

4. A process, as defined in claim 3, wherein the combination catalyst consists essentially of titanium tetrachloride and zinc chloride in substantially mole to mole ratio.

5. A process as defined in claim 1 wherein the titanium tetrahalide is titanium tetrachloride and the zinc-containing component is zinc dust.

6. A process for preparing a polymeric polyester which comprises subjecting (a) a saturated aliphatic glycol to reaction with (b) a mixture of sebacic acid, 2-ethylsuberic acid, and 2,5-diethyladipic acid at a temperature of from about 100° to about 250° C. in the presence of from about 0.01 to about one percent, based on the weight of the acid mixture, of a catalyst consisting essentially of titanium tetrachloride and a zinc-containing component selected from the group consisting of zinc and a zinc halide in a ratio of one mole of titanium tetrachloride to from about 0.1 to about ten mols of the zinc-containing component.

7. A process as defined in claim 6 wherein the zinc-containing component is zinc chloride.

8. A process as defined in claim 6 wherein the zinc-containing component is zinc dust.

References Cited in the file of this patent

UNITED STATES PATENTS

| | | |
|---|---|---|
| 1,873,296 | Cross | Aug. 23, 1932 |
| 1,985,343 | Connolly et al. | Dec. 25, 1934 |
| 2,249,950 | Fuller | July 22, 1941 |
| 2,437,232 | Rothrock et al. | Mar. 2, 1948 |
| 2,460,700 | Lyons | Feb. 1, 1949 |
| 2,729,619 | Sullivan | Mar. 18, 1954 |